Sept. 1, 1964   C. E. HIGGS   3,146,917
METHOD OF AND APPARATUS FOR DISPENSING LIQUIDS
Filed Feb. 16, 1961   3 Sheets-Sheet 1

INVENTOR
CYRIL EDWARD HIGGS
BY
his ATTORNEYS

Sept. 1, 1964 C. E. HIGGS 3,146,917
METHOD OF AND APPARATUS FOR DISPENSING LIQUIDS
Filed Feb. 16, 1961 3 Sheets-Sheet 2

INVENTOR
CYRIL EDWARD HIGGS
BY
Brumbaugh, Free, Graves & Donohue
his ATTORNEYS

INVENTOR
CYRIL EDWARD HIGGS

3,146,917
METHOD OF AND APPARATUS FOR DISPENSING LIQUIDS

Cyril Edward Higgs, Eastham, Wirral, England, assignor to Lever Brothers Company, New York, N.Y., a corporation of Maine
Filed Feb. 16, 1961, Ser. No. 89,836
Claims priority, application Great Britain Feb. 18, 1960
1 Claim. (Cl. 222—189)

This invention relates to methods of dispensing liquids, and more particularly to methods of dispensing water-immiscible liquids to the free surface of open bodies of water, i.e., to the surface of such bodies of water normally in contact with the atmosphere. The invention also relates to apparatus for carrying out such methods.

According to the invention there is provided a method of dispensing to the free surface of water a water-immiscible liquid having a density less than that of the water, said method comprising completely submerging a container containing a supply of the liquid below the free surface of the water and dispensing the liquid by allowing water to enter the container so as to displace the liquid which is thereby gradually expelled from the container and rises to the free surface of the water.

In many parts of the world, more especially in hot climatic areas, the problem of conserving water is very acute. One method of conserving water is by reducing the rate of its evaporation from reservoirs and other water storage areas. Evaporation of water can be reduced by forming over the surface of the water a very thin layer of, for example, a fatty alcohol. A fatty alcohol film is produced spontaneously when solid particles, such as beads or crystals, of fatty alcohol are in contact with a free water surface. The fatty alcohol film may also be produced in other ways such as by utilizing a solution of the alcohol in a water-immiscible solvent which solution is applied to the free water surface and from which solution a thin fatty alcohol layer, which is in fact a mono-molecular layer, spreads out. Because the fatty alcohol film is liable to loss and to destruction by various natural causes, such as strong winds or the presence of bacteria or protein in the water, it is necessary continuously to replace the lost or destroyed film. If the film is being produced from a solution it is necessary to provide some means of dispensing further quantities of the solution in order to maintain a satisfactory film on the water surface. The method of the present invention may be applied to the dispensing of such a solution of a water-evaporation control material.

A further application of the method of the invention is the dispensing of liquids immiscible with water and having a density less than that of water, to free water surfaces to combat the growth of water borne insects, for example for the control of malaria. In areas where malaria is prevalent it is customary to form on free water surfaces, especially where the water is stagnant, a film of a liquid which acts to combat growth of the larvae of mosquitoes and chironomids. The invention provides a novel and advantageous may of forming the liquid film. It is advantageous to incorporate in the liquid a spreading agent and as examples of spreading agents may be mentioned fatty alcohols such as cetyl alcohol, alkyl aryl sulphonates, fatty acid amines and quaternary ammonium compounds. Insecticides and the like may also be included.

In the method of the invention the liquid container is completely submeged below the level of the free water surface; thus, the temperature of the liquid in the container will remain substantially constant. This has the important advantage that any changes in the viscosity of the liquid will be relatively small with the consequence that changes in the rate at which the liquid is dispensed which would otherwise occur because of changes in viscosity of the liquid are absent or very slight. This is in contrast to the wide range of viscosity variations which would be experienced if the supply of liquid was at the surface of the water or on the banks around the edge of the water since the liquid would then be subject to the large differences in the night and day air temperatures which occur in many parts of the world.

A further advantage of the method of the invention is that by locating the liquid container in a position where it is completely submerged below the free water surface, the means for dispensing the liquid is less liable to damage or pilferage than if the source of supply were wholly or partly visible above the water surface.

Preferably, the rate at which the liquid is dispensed from the container is substantially constant to insure that the supply of liquid to the free water surface is maintained for a pre-determinable period. The particular rate at which the liquid should be dispensed to compensate for loss or destruction of the film will depend on local conditions.

Substantially constant dispensing may be effected by expelling the liquid from the container through the liquid outlet by utilising a differential hydrostatic pressure, constituting an effective head, existing substantially between the discharge orifice of the liquid outlet and the delivery orifice of the water inlet (the latter orifice being that from which the water leaves the inlet and is delivered into the body of the container); said delivery orifice of the water inlet being close to the upper part of the container. Effecting the expulsion of the liquid in this way is particularly advantageous because the rate of discharge of the liquid from the container is independent of the depth of the container below the free surface of the water. The delivery orifice of the water inlet should not be near the bottom of the container but should be close to the upper part of the container in order to dispense a large proportion of the liquid at a substantially constant rate. In practice it is desirable that the entry orifice of the liquid outlet (i.e., the orifice through which the liquid in the container enters the liquid outlet) should also be close to the upper part of the container in order to discharge a large proportion of the liquid.

The present invention also provides apparatus comprising a container adapted to contain a water-immiscible liquid having a density less than that of water, which container is provided with an inlet for allowing water to enter the container when the container is completely submerged below the free surface of water, and a liquid outlet through which liquid displaced by the water entering the submerged container may be gradually expelled as water enters the container through said inlet.

The present invention also provides apparatus comprising a container adapted to contain a water-immiscible liquid having a density less than that of water, which container is provided with an inlet for allowing water to enter the container when the container is completely submerged below the free surface of water, and with a liquid outlet through which liquid displaced by the water entering the submerged container may be gradually expelled, the discharge orifice of the liquid outlet, when the container is orientated with the liquid outlet uppermost, being at a level above that of the delivery orifice of the water inlet, said delivery orifice being close to the upper part of the container.

Preferably, the container is provided with a first channel that forms a communication between the interior and exterior of the container, which channel is provided at least in part by a length of narrow diameter tubing or equivalent constriction, the container also being provided with a second channel forming a communication between the interior and exterior of the container, the external end of the first channel, when the container is orientated with the first channel uppermost, being at a level above the internal end of the second channel. The container may have an opening which is closed by a closure member such as a bung or cap through which passes the first channel. The second channel may also pass through the closure member.

The present invention also provides dispensing means comprising a closure member such as a bung or cap for closing an opening in a container, through which closure member pass two channels, one of the channels being sealed by means through which extends a tube having a passage of capillary size, the dispensing means being such that the closure member is adapted to close the container opening in such manner that the capillary passage is remote from the interior of the container and the ends of the channels then adjacent the interior of the container are close to or flush with the closure member.

The liquid in the container may comprise a water-evaporation control substance, for example a solution of such a substance in a water-immiscible solvent. The substance preferably comprises a fatty alcohol having 12 to 22 carbon atoms, and is especially one comprising cetyl and/or stearyl alcohol. However, other substances which retard evaporation may be used. The solvent for the substance is preferably a straight chain hydrocarbon with a boiling range of approximately 150° to 300° C., for instance kerosene, such solvents being readily available and relatively cheap. However, other solvents such as more volatile straight-chain petroleum fractions may be used.

It will be appreciated that references in the specification to "cetyl alcohol" are not to be taken as necessarily meaning pure material. Cetyl alcohol is available commercially in a number of blends in which, although cetyl alcohol may be the main constituent, a number of other materials are present, chiefly the nearer fatty alcohol homologues, for example stearyl alcohol.

The liquid employed in the method and apparatus of the invention will usually be one having a density relative to that of water of less than 0.95 (measured at 4° C.) although for substantially all practical purposes the said relative density of the liquid may be as high as 0.99.

Embodiments of the invention will now be described by way of example with reference to the accompanying diagrammatic drawings in which.

Figure 1:
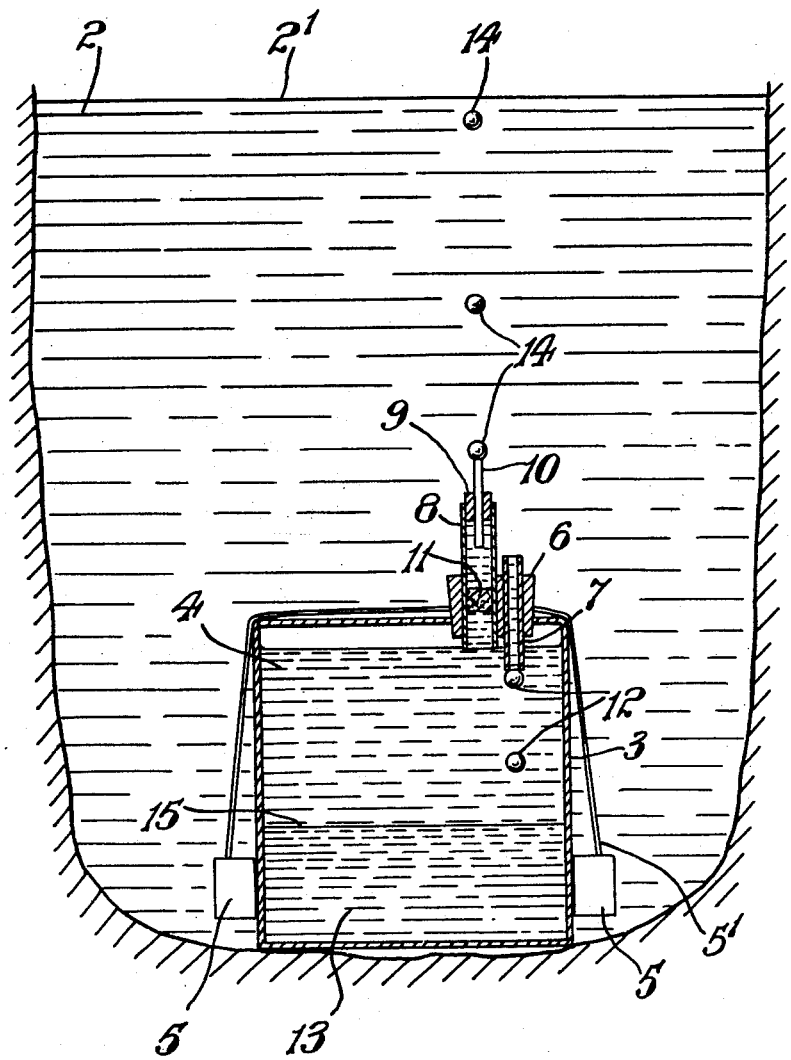
FIGURE 1 shows apparatus operating in accordance with the invention for dispensing a solution of a water-evaporation control material in a water-immiscible solvent to the free surface of water in a reservoir.

In FIGURE 1, there is shown a body of open water 2 having an extended free surface 2' normally in contact with the open air. Resting at the bottom of the body of water 2 and completely submerged below the free surface 2' of the water is a container 3 which at the time of submersion was substantially full of a solution 4 of a cetyl alcohol blend in kerosene. The container is sunk to and prevented from rising off the bottom by weights 5 attached to it by a cord 5', the weights 5 being arranged to maintain the container 3 in a vertical or substantially vertical position. At the top of the container are dispensing means including a closure member in the form of a rubber bung 6 fitted in an opening in the container and through which bung pass two channels provided by glass tubes 7 and 8, which tubes are held in rigidly fixed relationship by the bung 6. Passing through a rubber bung 9 sealing the upper end of the tube 8 is a length of capillary tube 10 of stainless steel; the tube 10 is conveniently constituted by a hypodermic needle. The tube 8 and capillary 10 together constitute the solution outlet of the apparatus, the open upper end of the capillary being the discharge orifice of the solution outlet, the open lower end of tube 8 being the entry orifice of the solution outlet. The tube 7 constitutes the water inlet of the apparatus and its open lower end is the delivery orifice of the water inlet. In the lower part of the tube 8 is a porous filter plug 11. The tube 8 may extend upward past the discharge orifice of the capillary 10 to shield the capillary tube.

The apparatus does not require any form of priming before being submerged. On submerging the apparatus, the solution 4 is discharged from the container 3 through the discharge orifice of the solution outlet by water entering through the inlet tube 7. When the water enters it falls to the bottom of the container as drops 12 and forms a layer 13. Some air is normally first expelled from the container 3 and from the tube 8 and capillary 10. If the lower end of tube 8 dips into the solution 4 at the time of submerging the container, the dispensing of the solution begins almost immediately, the air contained in the tube 8 and capillary 10 being first expelled as the solution rises in these tubes on entry of water through the tube 7. If the container 3 is not initially so full of solution and the lower end of tube 8 is not in the solution at the time of submerging the container, air will first be expelled until the surface level of the solution 4 is sufficiently raised, by the increase in volume of the water layer 13, to reach the lower end of the tube 8, and then the air in the tube 8 and capillary 10 is expelled on further entry of water.

The solution rises in the tube 8 and up through the capillary 10 by reason of the differential hydrostatic pressure, constituting an effective head, between the lower end of the water inlet tube 7 and the upper end of the capillary 10. Under the influence of this effective head, water continues to enter the container 3 and the solution is expelled from the discharge orifice of the capillary 10 and rises in the form of drops 14 to the free surface 2' of the water. Thus the rate at which the solution is dispensed from the container is substantially constant and is independent of the depth of the container in the water. The numerical value of the effective head, measured in, say, centimetres of water pressure, will differ from the actual vertical separation of the lower end of the tube 7 and the top end of the capillary 10 in proportion to the difference between the density of the water 2 and the density of the solution 4. The configuration of the interface between the solution 4 and the incoming water during the formation of the drops 12 at the delivery orifice of the tube 7 and the configuration of the interface between the water 2 and the expelled solution during the formation of the drops 14 at the discharge orifice of the capillary 10 may also affect the magnitude of the effective head. The actual configuration of these interfaces may depend on a number of factors including the interfacial tension between the water 2 and the solution 4 and the profile, material of construction, and surface condition of the tubes 7 and 10.

Since the lower end of the tube 7 is close to the bung 6, the water entering the container issues from the water inlet tube 7 at a point close to the upper part of the container. By reason of this, the effective head constituting the motive force tending to expel the solution 4 from the container, and therefore the rate of dispensing, is substantially independent of the amount of water that has entered the container. It is only when the water layer 13 in the container reaches the lower end of the inlet tube 7 that further entry of water will affect the magnitude of the effective head and tend to reduce the rate of the dispensing of the solution. Of course, the actual rate at which the solution is dispensed as well as depending on the effective head, will also depend on the length and internal diameter of the capillary 10 and control over the rate of flow of the solution from the container can be effected by varying any of these factors.

Particles of solid matter present in the body of the water are in practice found to enter the container. On entering the container they concentrate at the interfacial boundary 15 between the solution 4 and the water layer 13 or remain suspended in or fall to the bottom of the water layer 13. It has been found that such particles are not normally retained in the less dense solution 4 but agitation of the water layer, such as for example by aquatic life entering the container, may cause particles of solid matter to be carried upwards through the solution and into proximity with the solution outlet. To reduce the risk of such particles blocking the capillary 10, the porous plug 11 is employed. The plug 11 may be made from any convenient fibrous material either in the form of loose fibres, matted fibres or loosely woven fabric; the fibres may be of wool or cellulose or a synthetic material. In certain cases it is possible, however, to dispense with this plug.

A typical composition for the solution 4 is a 2% (w./w.) solution of "Cetol 34" in kerosene. "Cetol 34" is a cetyl alcohol blend available from Price's (Bromborough) Limited and has the following approximate constitution: cetyl alcohol 42%, stearyl alcohol 40%, myristyl alcohol 10% and unsaturated alcohols 8%.

A table of values is given below which includes typical values for the dimensions of various component parts of the apparatus described.

*Table of Values*

| | |
|---|---|
| Length of tube 7 | 5 cm. |
| Internal diameter of tube 7 | 0.6 cm. |
| Length of tube 8 | 5 cm. |
| Internal diameter of tube 8 | 0.9 cm. |
| Length of capillary 10 | 3.8 cm. |
| Internal diameter of capillary 10 | 0.055 cm. |
| Distance between the upper end of capillary 10 and the lower end of tube 7 | 10 cm. |
| Rate of dispensing of the solution at 20±3° C. | 27 cc. per hour. |
| Diameter of upper face of bung 6 | 5 cm. |
| Diameter of lower face of bung 6 | 4.2 cm. |
| Length of bung 6 | 3 cm. |
| Dimensions of container 3 (for containing about 18 litres of solution) | 24 cm. x 24 cm. x 34 cm. deep. |

It will be apparent that other values for the effective head, the internal diameter of capillary 10 and length of capillary 10 may be selected in order to give a rate of flow of 27 cc. per hour. Other rates of flow may be obtained by appropriate choice of these rate determining factors.

With apparatus of the type described above and arranged to dispense solution at about 22 cc. per hour, 18 litres of a 3% (w./w.) solution in kerosene of cetyl alcohol provides a dosage of about 13 grams per day for about 35 days, i.e., a dosage of about 6 monolayers per day on a water surface of a quarter of an acre. It may be mentioned here that there is no deterioration in the taste of water that has been protected from evaporation by cetyl alcohol.

Apparatus of the type described is particularly suitable for use with areas of water up to about one acre, and provides a simple means, requiring normally no attention, of maintaining an adequate protective film over the free surface of the water for the period that discharge of the solution continues.

The internal diameter of the water inlet tube 7 is not of great importance. However, if it is too small there is a risk of blockage by matter present in the water. On the other hand, if the diameter is chosen too large, it is found that the cetyl alcohol solution 4 may escape through this inlet at the same time as the water enters.

Whereas the tubes 7 and 8 are described above as being of glass, other materials such as metal or a plastic may be used for these tubes although it may be necessary to select different dimensions to obtain the same operating conditions. The capillary 10 could also be of glass or a plastic. It will be seen from FIGURE 1, and more clearly from FIGURE 2, that the bottom of the water inlet tube 7 is at a lower level than the bottom of the tube 8 of the solution outlet. This is preferred because it has been found that it assists in insuring that the apparatus is self-priming. It has also been found that by not filling the container completely with solution so that there is a small air space between the lower end of the inlet tube 7 and the upper surface of the solution 4, further assistance is given to insuring a self-priming action, and, furthermore, steady flow conditions are more quickly established.

The inlet tube 7 does not extend far into the container 3 because the period over which solution is dispensed at a substantially constant predeterminable rate would otherwise be reduced. This is explained by the fact that once the solution/water interface 15 reaches the bottom of the inlet tube 7, the position of this interface is then the factor which determines the effective head rather than the position of the lower end of the tube 7, and thus, as more water enters the container and the interface rises, the effective head, and therefore the rate at which the solution is dispensed, decreases.

However far the inlet tube 7 extends into the container 3, it is desirable that the tube 8 should not extend very far into the container and preferably terminates flush with or very close to the bung 6. The reason for this is that once the interface 15 reaches the lower end of tube 8 no more solution can be dispensed and if tube 8 extends unduly into the container, a large volume of solution 4 will be trapped in the upper part of the container after the dispensing has ceased. It has furthermore been found that if, at the time of submerging the container, the tube 8 extends further into the container than the inlet tube 7, and the latter tube does not dip into the solution 4, then the distance between the lower end of the inlet tube 7 and either the lower end of the tube 8 or the upper surface of the solution 4, whichever distance is the shorter, must not be too great or else the apparatus will not be self-priming.

In self-priming arrangements where the inlet tube 7 does not extend as far into the container as the tube 8 of the solution outlet, and the tube 7 does not dip into the solution 4, the downward pressure of the column of air between the lower end of the tube 7 and the upper surface of the solution 4 in theory, due to the weight of this air column, influences the magnitude of the effective head tending to expel the solution through the outlet. However, this downward pressure is infinitesimally small compared with the downward pressure exerted by the column of solution between the discharge orifice of the capillary tube 10 and the level of the surface of the solution in the container and with the column of water between the level of the discharge orifice of the capillary 10 and the delivery orifice of the inlet 7. The effective head is, therefore, with such self-priming arrangements, as in all other cases, substantially equal to the difference in the hydrostatic pressures existing at the delivery orifice of the inlet 7 and the discharge orifice of the capillary tube 10, the differential hydrostatic pressure being equal to the difference in the pressures exerted by the water and solution columns previously mentioned.

Figure 2:
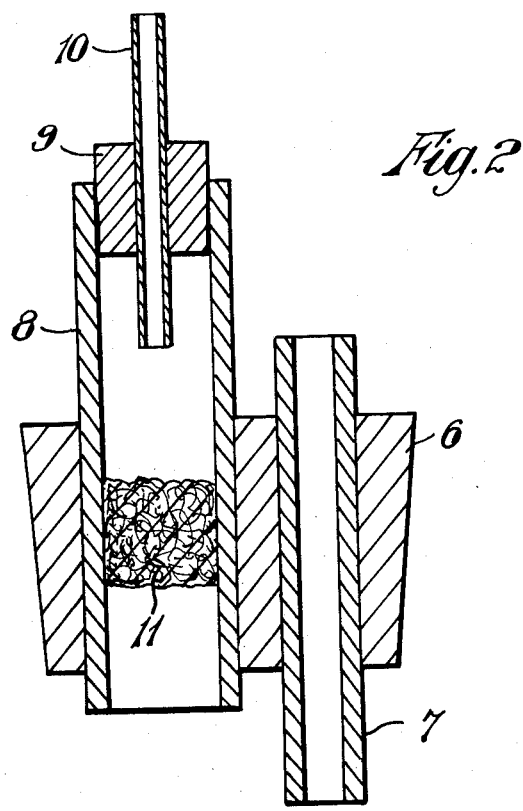
FIGURE 2 shows a cross-sectional view of the dispensing means of the apparatus of FIGURE 1 on a larger scale.

It is preferred, as shown in FIGURES 1 and 2, to arrange the upper end of the water inlet tube 7 below the discharge orifice of the capillary tube 10. It has been found that this further assists the self-priming of the apparatus. Once the flow of solution has commenced, the position of the upper end of the water inlet tube 7 has no effect on the operation of the apparatus.

Figure 3:
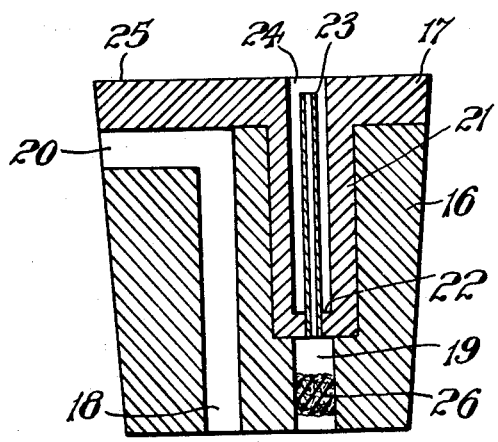
FIGURE 3 shows a cross-sectional view of an alternative form of dispensing means.

FIGURE 3 shows an alternative form of dispensing means comprising two co-operating parts 16 and 17 of a plastic such as polyethylene. The lower part 16 which is of frusto-conical shape constitutes a closure for a container and corresponds to the bung 6 of FIGURES 1 and 2. Through the part 16 passes a first channel constituted by a bore 18 and a slot or groove 20 which connects the bore 18 to the curved outer face of the part 16, and a second channel 19. The channel 19 has an upper wider portion in which is tightly fitted a hollow cylindrical plug 21 which is integral with the part 17. A lower end portion 22 of the plug 21 acts to seal the channel 19. Passing through the portion 22 is a capillary tube 23 in the form of a hypodermic needle which extends along the length of the hollow region 24 of the plug 21 but does not extend beyond the upper face 25 of the part 17 of the dispensing means and is thereby shielded. A filter plug 26 is situated in the lower part of the channel 19.

When fitted in position to close an opening in a container for carrying out the invention, the channel formed by the bore 18 and slot 20 constitutes a water inlet to the container and the channel 19 and capillary tube 23 constitutes the liquid outlet. By reason of the frusto-conical shape of the part 16 the latter is adapted to close the container opening with the capillary tube 23 remote from the interior of the container. Furthermore, the ends of the water inlet and liquid outlet adjacent the interior of the container when the dispensing means is fitted in position, are, in this embodiment, flush with the closure part 16.

Figure 4:
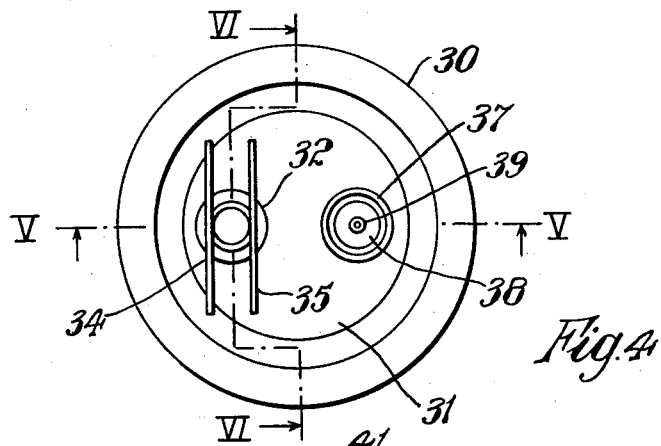
FIGURE 4 shows a plan view of a further form of dispensing means.
Figure 5:
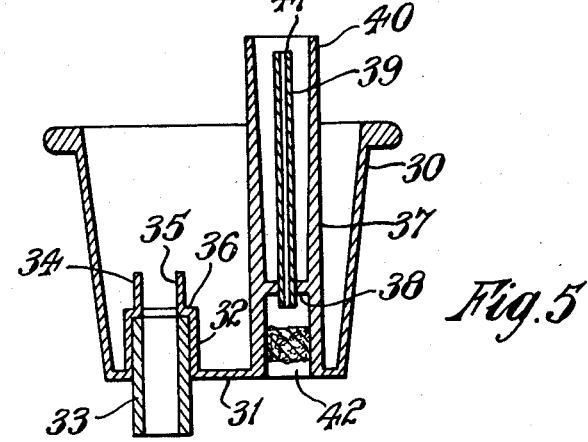
FIGURE 5 is a section on the line V—V of FIGURE 4.
Figure 6:
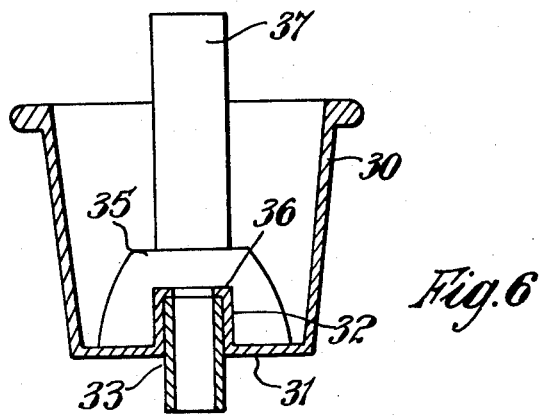
FIGURE 6 is a section on the line VI—VI of FIGURE 4.

In the embodiment shown in FIGURES 4, 5 and 6, the closure member of the dispensing means comprises a hollow frusto-conical cup-shaped body 30 having a base 31 and made of a resilient material such as polyethylene. The water inlet of the dispensing means is provided by a tubular portion 32 upstanding from the base 31 and integral with it, in which tubular portion there is fitted a short length of glass tube 33 which extends a little below the base 31. To reduce the likelihood of obstruction of the inlet channel defined by the glass tube 33 by any matter present in the water of a water storage in which the dispensing means may be used, two planar shields 34 and 35 are provided extending above the upper end 36 of the part 32. The shields 34, 35 are formed integral with the part 32 and base 31.

From the base 31 and integral with it, extends a second tube 37 which has near its lower end an integral partition 38 which acts to seal off the lower part of the tube from the upper part. Through the partition 38 extends a capillary tube 39, which may be in the form of a hypodermic needle, providing the constriction of the solution outlet which is comprised by the lower part of the tube 37 below the partition 38 and the capillary tube 39. The upper end 40 of the tube 37 extends beyond the discharge orifice 41 of the capillary tube 39 thereby protecting it from mechanical damage and also reducing the likelihood of matter present in the water settling over and obstructing the outlet. A filter plug 42 is provided in the solution outlet.

Although in each of the embodiments of the dispensing means described above there is present only one water inlet and one liquid outlet, the dispensing means may, if desired, comprise more than one such inlet or outlet.

Although as a material for reducing the rate of evaporation of water, cetyl alcohol is preferred, many other materials either in the pure state or in admixture may be used. These include particularly the other fatty alcohols and especially the saturated straight chain primary alcohols having carbon chains of 12 to 22 carbon atoms such as stearyl alcohol, as well as including certain long chain acids, amines, amides, ketones, and esters having the property of reducing the rate of evaporation of water. These other materials reduce the rate of evaporation of water to different extents and in general, under practical field conditions, are less efficient than cetyl alcohol.

As has been stated above the rate at which the liquid should be dispensed to provide film-forming material on the water surface to compensate for the loss or destruction of surface film will depend on local conditions. This rate may be determined by experiment and the requisite dispensing may be effected either by adjustment of the dispensing means to give the desired dispensing rate or, alternatively, an appropriate number of containers may be employed which are each adapted to dispense the liquid at a predetermined lower rate. In general the latter course will be preferable as adjustment of the dispensing means to increase the rate of flow would mean that for a given size of container the supply of liquid would be exhausted quicker entailing a more frequent replenishment of the container or, as may sometimes be more convenient, the positioning of a further container without recovery of the exhausted one. When the method of the invention is applied to the dispensing of a solution of a water-evaporation control material, a further alternative way of varying the rate at which the control material is supplied to the surface is by alteration of the concentration of the material dissolved in the water-immiscible solvent. At the water storage temperatures most frequently encountered no substantial increase of the concentration above 3% (w./w.) for cetyl alcohol may be achieved when using kerosene, and in order to obtain such higher dissolved contents of cetyl alcohol, recourse to alternative water-immiscible solvents may be necessary. A number of containers simultaneously dispensing solutions of evaporation control material at the same or different rates could also be employed to provide the desired rate of surface film generation.

Although in each of the embodiments described only part of the liquid outlet of the dispensing means is provided by a channel of capillary size, it will be clear that the whole of this outlet may be formed by a capillary channel although in such a case it is not readily possible to employ a filter plug.

Instead of employing a capillary channel in the outlet to provide the desired slow dispensing rate, a capillary channel or equivalent constriction could alternatively be provided in the water inlet to the container. Moreover both inlet and outlet could each comprise a capillary channel. It is much preferred, however, to provide the capillary channel in the liquid outlet since a self-priming apparatus is less readily constructed if the water inlet channel comprises a capillary passage.

What is claimed is:

Means for dispensing a water-immiscible liquid from a container submerged beneath a body of water to the free surface of the water comprising:
 (a) a closure member for closing an opening in said container;
 (b) a first channel passing through said closure member to allow water to enter the container when said container is submerged beneath the body of water;
 (c) a second channel passing through said closure member through which is gradually discharged the water-immiscible liquid displaced by the water entering the container;
 (d) sealing means to seal said second channel;
 (e) a capillary tube extending through said sealing means and being remote from the interior of the container when the closure member closes the opening in the container;
 (f) a porous filter plug located in said second channel to prevent solid matter from blocking the capillary tube and thereby impeding discharge of the water-immiscible liquid;
the ends of said first and second channels adjacent the interior of the container being close to or flush with the closure member when the opening in the container is closed by said closure member, said dispensing means being arranged so that the water-immiscible liquid is slowly discharged from the container at a substantially constant rate.

References Cited in the file of this patent

UNITED STATES PATENTS

| | | | |
|---|---|---|---|
| 1,623,371 | Wetmore | | Apr. 5, 1927 |
| 1,887,343 | Wetmore | | Nov. 8, 1932 |
| 1,970,688 | Callahan | | Aug. 21, 1934 |
| 2,500,199 | Nesset | | Mar. 14, 1950 |
| 2,812,117 | Butkus et al. | | Nov. 5, 1957 |

FOREIGN PATENTS

| | | |
|---|---|---|
| 184,586 | Switzerland | Oct. 1, 1936 |
| 752,800 | France | July 24, 1933 |